April 19, 1960 D. N. MacDONALD ET AL 2,933,205

MECHANICAL MANIPULATOR

Filed March 14, 1958 4 Sheets-Sheet 1

DUNCAN N. MACDONLD
WALTER V. LORD
KENJI JACK SAMESHIMA
INVENTOR.

BY Christie, Parker & Hale
ATTORNEYS

April 19, 1960 D. N. MacDONALD ET AL 2,933,205

MECHANICAL MANIPULATOR

Filed March 14, 1958 4 Sheets-Sheet 2

DUNCAN N. MACDONALD
WALTER V. LORD
KENJI JACK SAMESHIMA
INVENTORS

BY Christie, Parker & Hale
ATTORNEYS

April 19, 1960 D. N. MacDONALD ET AL 2,933,205

MECHANICAL MANIPULATOR

Filed March 14, 1958 4 Sheets-Sheet 3

DUNCAN N. MACDONALD
WALTER V. LORD
KENJI JACK SAMESHIMA
INVENTORS

BY Christie, Parker & Hale
ATTORNEYS

DUNCAN N. MACDONALD
WALTER V. LORD
KENJI JACK SAMESHIMA
INVENTORS

BY Christie, Parker & Hale
ATTORNEYS

2,933,205

MECHANICAL MANIPULATOR

Duncan N. MacDonald, Arcadia, Walter V. Lord, Pasadena, and Kenji Jack Sameshima, West Covina, Calif., assignors to Burroughs Corporation, Detroit, Mich., a corporation of Michigan Application March 14, 1958, Serial No. 721,583

10 Claims. (Cl. 214—1)

The present invention relates to positioners, and more particularly to a digital-to-analog positioner.

The problems involved in mass production have led to the development of many specialized automation techniques. Such specialized techniques have been employed to great advantage in the manufacture of large quantities of many products, such as vacuum tubes, lamps, etc. However, such specialized techniques do not lend themselves to the manufacture of products such as semiconductor devices which are subject to rapid and continuous changes in design. The problem of manufacturing large quantities of semiconductor devices and certain other products is further complicated by the extreme precision of manufacture required and the sensitivity of the devices during manufacture to external influences, such as environmental changes and contamination with foreign bodies. The sensitivity of the devices to external influences renders the use of human operators for manually positioning and performing operations on the devices unsatisfactory.

In accordance with the present invention a digital-to-analog positioner is provided which is capable of positioning and performing operations on semiconductor devices and other products with extreme precision in a controlled environment to prevent contamination of the products during manufacture.

In accordance with the present invention a digital-to-analog positioner is provided which includes a stationary base and an arm arrangement or mechanical manipulator pivotally connected to the base about a single axis and having a plurality of degrees of freedom. Means responsive to digital control signals are coupled to the manipulator for controlling each degree of freedom to cause the manipulator to accurately position a workpiece, such as a semiconductor device or a suitable tool, at any position within a given work space in accordance with digital signals. Each degree of freedom is thus controlled in accordance with a digital signal that may be derived from a general purpose digital computer. By suitably programming the computer any desired number of operations may be performed on an article of manufacture by one or more of the positioners in conjunction with known tools and these operations may be readily changed to accommodate design changes in the article by reprogramming the computer. Furthermore, the positioner of the present invention may be easily moved from one location to another to facilitate manufacturing changes.

The invention is explained in reference to the accompanying drawings, in which.

Figure 1:
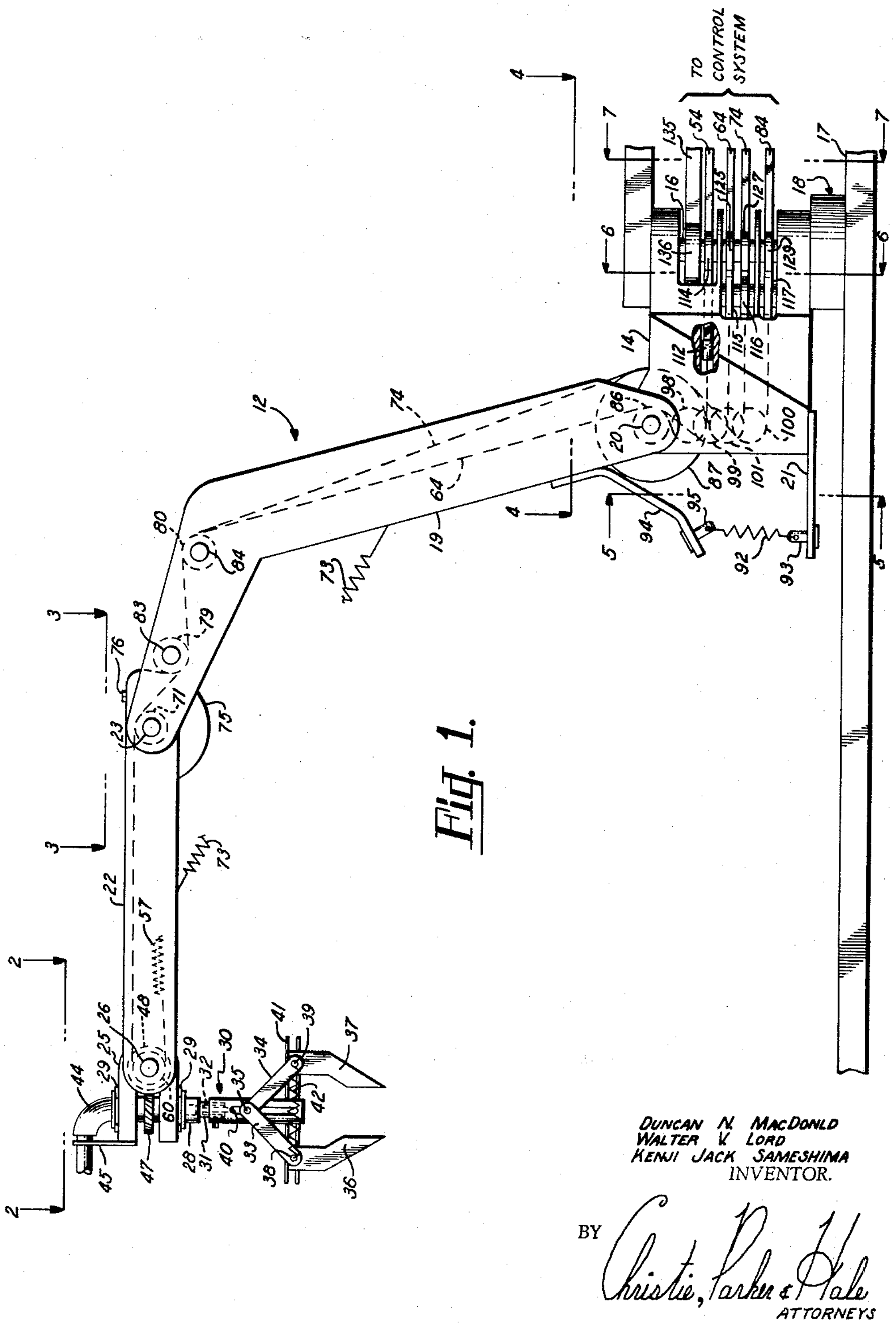
Fig. 1 is a side elevation, partly broken away, of an arm arrangement for use in the present invention.

Referring now to the drawings, and more particularly to Fig. 1 thereof, an arm arrangement or mechanical manipulator indicated generally at 12 is pivotally mounted about a single axis on a stationary base 17 and provided with five degrees of freedom, as will be more fully described hereinafter. The arm arrangement includes a swinging base 14 which is rotatably mounted about a generally vertically disposed axis on the stationary base 17 by means of a shaft 16. The shaft 16 is suitably secured to the swinging base 14 and journaled at each end in the stationary base 17. A spacer 18 is also mounted on the shaft 16 and disposed between the lower end of the swinging base 14 and the stationary base 17 to provide clearance for a bracket 21, which is secured to the swinging base 14. One end of a boom 19 is rotatably mounted on the swinging base 14 about a generally horizontally disposed axis by means of a shaft 20 which is secured to the boom and journaled at each end in the swinging base. A beam 22 is rotatably mounted at one end to the end of the boom remote from the swinging base about a generally horizontally disposed axis by means of a shaft 23 which is secured to the beam and journaled in the boom 19. A wrist member 25 in the form of a bifurcated journal is rotatably mounted to the end of the beam remote from the boom about a pair of coaxial horizontally disposed shafts 26 and 27. An elongated tool holder 28 is journaled in the wrist member 25 and secured thereto by means of snap rings 29.

The tool holder 28 may be provided with a collet-type chuck in the lower end thereof to receive a suitable tool 30. The tool 30 is provided with a tubular member 31 at the upper end thereof which is engaged by the tool holder. A piston 32 is slidably mounted within the tubular portion of the tool and is connected to one end of a pair of actuating arms 33 and 34 through a pin 35 which is arranged to ride in a vertically disposed slot 40 in the tool 30. The other ends of the arms 33 and 34 are connected to the upper ends of a pair of jaw members 36 and 37, respectively, by means of pins 38 and 39. The pins 38 and 39 are arranged to ride between two guide rods 41 so that movement of the piston 32 will cause the jaw members 36 and 37 to move outwardly or inwardly along the guide rods 41. A biasing spring 42 is connected between the pins 38 and 39 for biasing the jaws 36 and 37 in a closed position. The tool holder 28 may be provided with an air passage through the central portion thereof which is in communication with the tubular member 31. A conduit 44 is connected at one end to the upper end of the tool holder 28 to communicate with the interior of the tool holder and the cylinder 31. A bracket 45 is secured to the conduit 44 and to the wrist member 25 to support the conduit. Air or fluid under pressure may be supplied to the conduit 44 for moving the piston 32 within the cylinder 31 to open or close the jaws 36 and 37.

A helical gear 47 is mounted on the tool holder 28 and arranged to mesh with another helical gear 48 that is secured to the shaft 27 for rotating the tool holder and the tool 30 in response to rotation of the gear 48. A pulley 51, having bosses 52 thereon, is also mounted on the shaft 27 to rotate therewith, and the shaft 27 is journaled in the wrist member 25 and the beam 22, as may best be seen in Fig. 2. A flexible band 54, which may be formed of steel, is disposed over the rim of the pulley 51 and includes a plurality of apertures 55 which are arranged to cooperate with the bosses 52 so that the pulley 51 and the gear 48 will rotate as the band 54 is moved relative thereto. One end of the band 54 is connected to an actuating mechanism which will be described later for controlling the rotational position of the tool 30. A tool holder biasing spring 56 is connected between the other end of the band 54 or the end which passes under the pulley 51 and a portion of the beam 22 that is remote from the shaft 27 to apply a force to the band 54.

Figure 2:
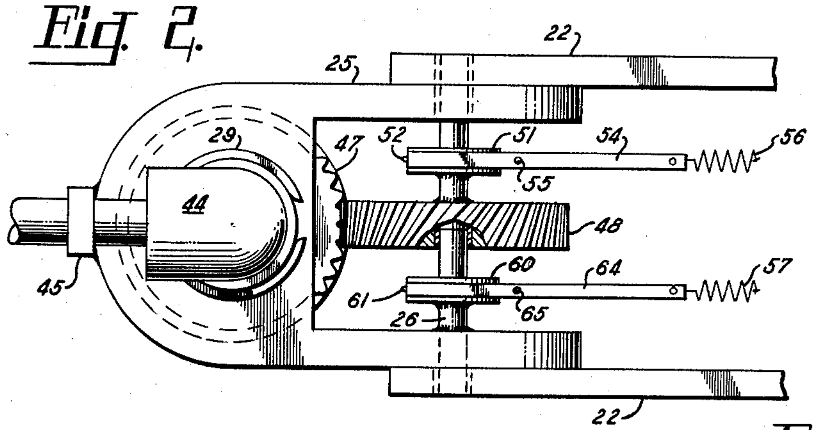
Fig. 2 is an enlarged plan view, partly broken away, taken along line 2—2 of Fig. 1.

To control the rotational position of the wrist member 25 relative to the beam 22 a pulley 60, which is also provided with bosses 61, is suitably secured to the shaft 26 for rotation therewith. The shaft is secured to the wrist member 25, for example, by welding, and journaled in the gear 48 and the beam 22, as is shown in Fig. 2, so that rotation of the pulley 60 will cause the wrist member 25 to rotate relative to the beam 22. A flexible band 64 is disposed over the rim of the pulley 60 and is provided with apertures 65 adapted to cooperate with the bosses 61 so that the pulley 60 and the wrist member 25 will rotate as the band 64 is moved relative thereto. One end of the band 64 is also connected to a suitable actuating mechanism which will be described. A wrist member biasing spring 57 is connected between a portion of the beam 22 that is remote from the pulley 60 and the other end of the band 64 to urge the band 64 in a direction to rotate the wrist member 25 in a counterclockwise direction with respect to the beam 22.

Figure 3:
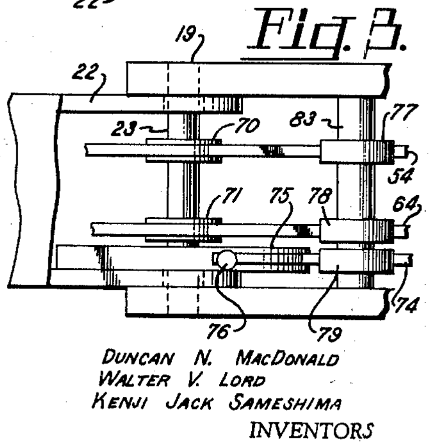
Fig. 3 is an enlarged plan view, taken along line 3—3 of Fig. 1.

The bands 54 and 64 are extended along the length of the beam 22 and disposed over the rims a pair of pulleys 70 and 71 that are rotatably mounted on the shaft 23, as may be seen in Fig. 3. Another flexible band 74 is connected at one end to a thin drum 75 by means of a bolt 76 which threadably engages the drum. The drum 75 is secured to the beam 22 for rotation therewith so that movement of the other end of the band 74, which is connected to an actuating mechanism to be described later, will rotate the beam 22 in a clockwise direction relative to the boom 19. A beam biasing spring 73 is connected between the beam 22 and the boom 19, as shown in Fig. 1, for biasing the beam in a counterclockwise direction.

The pulleys 51, 60, 70 and 71 preferably have equal diameters so that rotation of the beam relative to the boom will wind or unwind the bands 54 and 64 on the rims of the pulleys 70 and 71 equal amounts. Assuming that the ends of the bands 54 and 64 that are not connected to the springs 56 and 57 are prevented from moving during the rotation of the beam relative to the boom, the bands 54 and 64 will move equal amounts with respect to the pulleys 51 and 60 during rotation of the beam 22 and thus prevent relative rotation between the gears 47 and 48. The movement of the band 64 as the beam is rotated also causes the wrist member 25 to rotate with respect to the beam through an angle equal to the angle that the beam rotates with respect to the boom but in an opposite direction. Thus, the wrist member and the tool holder are maintained in parallel planes, which may be vertical planes, while the beam 22 is rotated in a clockwise or counterclockwise direction relative to the boom 19.

Figure 4:
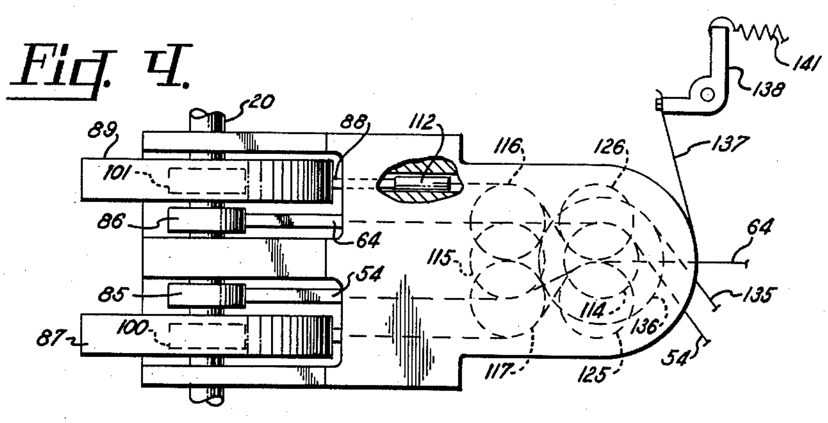
Fig. 4 is an enlarged plan view, partly broken away, taken along line 4—4 of Fig. 1.
Figures 5, 6, 7:
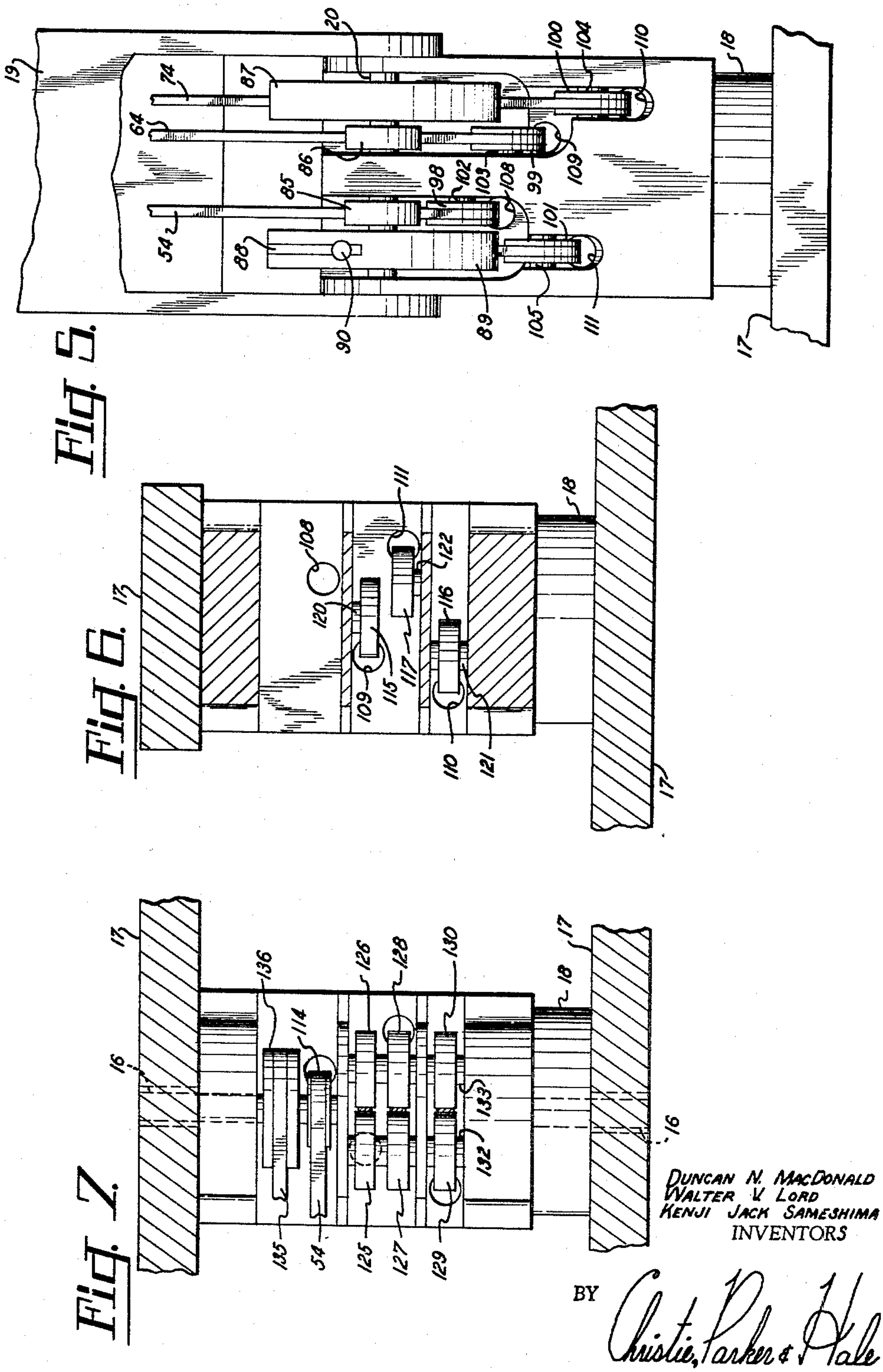
Fig. 5 is an enlarged front view, taken along line 5—5 of Fig. 1.
Fig. 6 is an enlarged sectional view taken along the line 6—6 of Fig. 1.
Fig. 7 is an enlarged sectional view, taken along the line 7—7 of Fig. 1.

To guide the bands 54, 64 and 74 along the length of the boom 19, pulleys 77—82 are rotatably mounted at the upper end of the boom. The pulleys 77—79 are journaled on a shaft 83 which is suitably secured to the boom 19, as shown in Fig. 3. The pulleys 80—82 are identical to the pulleys 77—79 and are journaled in the same respective positions on a shaft 84 which is also connected to the boom 19 (see Fig. 1). The bands 54, 64 and 74 pass under the pulleys 77, 78 and 79 respectively, and over the pulleys 80, 81 and 82 respectively. From the pulleys 80—82 the bands 54, 64 and 74 extend along the straight portion of the boom 19 to pulleys 85, 86 and 87, respectively, which are rotatably mounted on the shaft 20 as shown in Figs. 4 and 5. The pulleys 85 and 86 are preferably of the same diameter as the pulleys 51 and 60 so that rotation of the boom 19 relative to the base 14 will cause the wrist member 25 to rotate in an opposite direction and maintain the wrist member 25 and the tool 30 in parallel planes as the boom 19 is rotated. The pulley 87 preferably has a diameter equal to the diameter of the thin drum 75 so that rotation of the boom relative to the swinging base will wind or unwind the band 74 on the pulley 87 and thus cause the beam 22 to rotate in an opposite direction such that the beam 22 is also maintained in parallel planes as the boom 19 is rotated relative to the swinging base. One end of a flexible band 88 is secured to another thin drum 89 by means of a bolt 90, which threadably engages the drum 89. The drum 89 is suitably secured to the shaft 20 to rotate therewith so that movement of the other end of the band 88, which is connected to an actuating mechanism to be described, will rotate the boom 19 in a clockwise direction relative to the swinging base 14. A boom biasing spring 92 is connected at one end to the bracket 21 by means of a pin 93 and at the other end to a bracket 94 by means of a pin 95. The brackets 21, 94 are secured to the swinging base 14 and to the boom 19, respectively, by any suitable means. The spring 92 urges the boom in a counterclockwise direction relative to the swinging base.

The bands 54, 64, 74 and 88 are guided by the pulleys 85, 86, 87 and the drum 89 to pulleys 98, 99, 100 and 101, respectively. The pulleys 98—101 are rotatably mounted on shafts 102—105 which are secured to the swinging base 14, as shown in Fig. 5. The bands 54, 64, 74 and 88 are disposed over the rims of the respective pulleys 98—101 and then through cylindrical bores 108—111 within the swinging base 14. Each of the bands is rotated 90° by means of suitable connecting links 112, two of which are shown in Figs. 1 and 4. The bands 54, 64, 74 and 88 extend through the respective cylindrical bores and over the rims of pulleys 114, 115, 116 and 117, respectively. The pulleys 115—117 are rotatably mounted on shafts 120—122, which are suitably secured to the swinging base, as may be seen in Fig. 6. The pulley 114 is rotatably mounted on the shaft 16. The diameter of the pulley 114 is preferably equal to the diameter of the pulley 51 so that rotation of the swinging base will cause the band 54 to wind or unwind on the rim of the pulley 114 and thereby turn the pulley 51 to cause the tool holder 28 and the tool 30 to rotate through an angle equal to the angle of rotation of the swinging base but in an opposite direction.

Referring to Figs. 4 and 7 three pairs of pulleys 125—130 are rotatably mounted on the swinging base 14 to guide the bands 64, 74 and 88 substantially through the axis of the shaft 16 so that relative rotation between the swinging base and the stationary base 17 will not appreciably lengthen or shorten the portions of the bands 64, 74 and 88 that extend through the manipulator 12. As is shown in Fig. 7, the pulleys 125, 127 and 129 are rotatably mounted on a shaft 132 which is secured to the swinging base and the pulleys 126, 128 and 130 are rotatably mounted on a parallel shaft 133 which is also secured to the swinging base. The axis of the shafts 132 and 133 may be positioned slightly forward of the axis of the shaft 16 as may be seen in Fig. 4, to compensate for the tendency of the bands 64, 74 and 88 to wind around the rims of the pulleys 125—130, as the swinging base is rotated. Thus only the tool holder 28 and the tool 30 move relative to the swinging base as the swinging base is rotated.

To rotate the swinging base, a flexible band 135 is connected to a thin drum 136, which in turn is coupled to the shaft 16 for rotation therewith. The other end of the band 135 is connected to an actuating mechanism which will be described later. Another band 137 is connected between the lower end of the swinging base and one end of an L-shaped lever 138 as shown in Fig. 4. The lever 138 is rotatably mounted on the stationary base by means of a pin 140. The other end of the lever 138 is biased in a counterclockwise direction by means of a biasing spring 141 which is connected between the lever 138 and another portion of the stationary base (not shown). The spring 141 urges the swinging base in a counter-clockwise direction relative to the stationary base.

Figure 8:
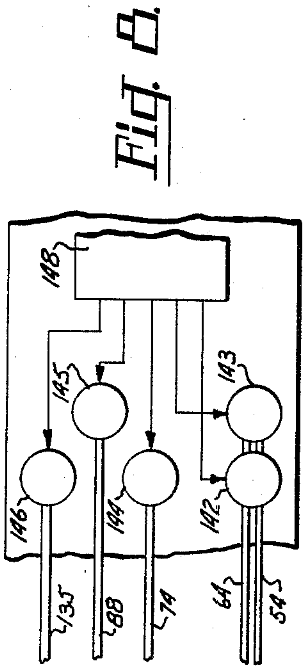
Fig. 8 is a plan view of the control system for the manipulator of Fig. 1.

To control the different degrees of freedom of the mechanical manipulator 12, actuating mechanisms 142—146 are connected to the bands 54, 64, 74, 88 and 135, as shown in Fig. 8. Each of the actuating mechanism is adapted to move the end of the flexible band connected thereto towards or away from the manipulator 12 in response to a digital control signal which may be provided by a digital computer 148. Thus the actuating mechanisms are arranged to convert a digital signal to an analog quantity of unit lengths. One type of digital-to-analog converter that may be utilized to actuate the flexible bands of the manipulator 12 is shown in Figs. 9 and 10.

Figure 9:
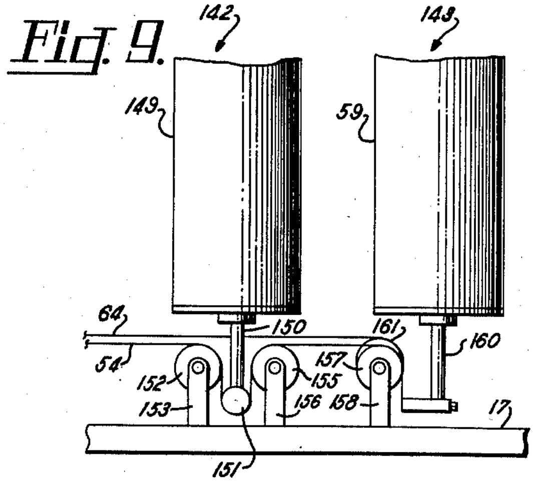
Fig. 9 is a side elevation view showing two of the digital-to-analog converters utilized in the control system of the present invention.
Figure 10:
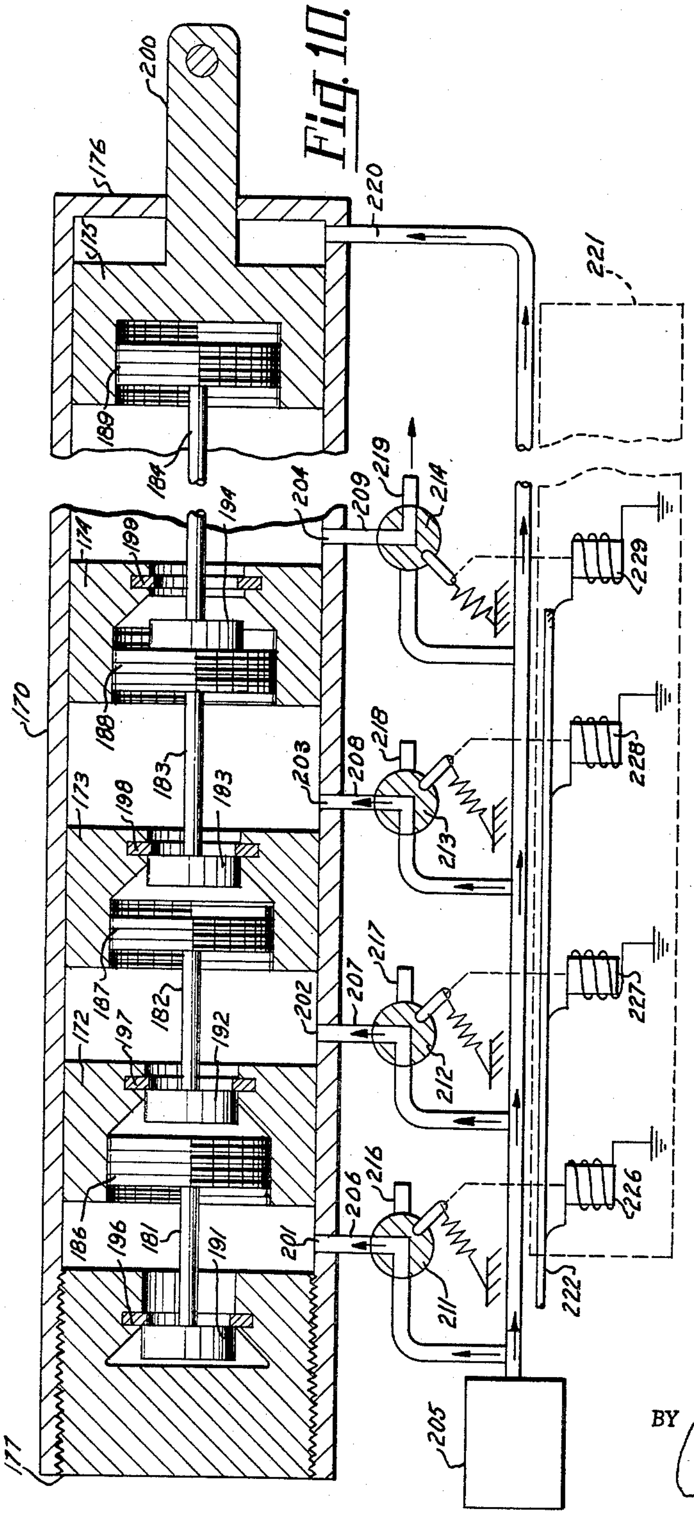
Fig. 10 is a sectional elevation of one of the digital-to-analog converters shown in Figs. 8 and 9.

Referring to Fig. 9, the digital-to-analog converters 142 and 143 are illustrated as including cylinders 149 and 159, respectively. The converter unit 142 is coupled to the band 54 through a plunger 150 and a pulley 151 which is secured to the plunger 150. The position of the plunger 150 with respect to the cylinder 149 is representative of a digital signal supplied to the converter unit 142, as will be more fully described later. The bands may be rotated through an angle of 90° between the swinging base 14 and the converter units by any suitable means so that the bands lie in a horizontal plane as shown in Fig. 9. The band 54 passes over a pulley 152 which is rotatably mounted on a bracket 153 that is secured to the stationary base 17. The band 54 then passes under the pulley 151 and over another pulley 155, which is rotatably mounted on a bracket 156 that is also secured to the base 17. Band 54 extends from the pulley 155 to another pulley 157 which is rotatably mounted on a bracket 158 that is secured to the base 17. After passing over the pulley 157 the band 54 is suitably connected to a plunger 160 of the converter unit 143. The band 64 is disposed over the rim of a pulley 161 which may also be rotatably mounted on the bracket 158 and is suitably connected to the plunger 160. The converter unit 142 thus controls the rotational position of the tool holder 28 and the tool 30, while the converter unit 143 controls the rotational position of both the wrist member 25 and the tool holder 28. Movement of the plunger 160 causes both of the bands 54 and 64 to move toward or away from the manipulator 12 the same amount which results in turning both of the pulleys 51 and 60 equal amounts and thus prevents relative rotation between the gears 47 and 48 while causing the wrist member to rotate relative to the beam 22. In this manner the tool is prevented from rotating when the wrist member 25 is rotated by the converter unit 143.

One digital-to-analog converter unit that may be used in the apparatus of the present invention is disclosed and claimed in the co-pending application for Duncan N. MacDonald, Serial No. 652,879, filed April 15, 1957. This converter unit is described in reference to Fig. 10. Within a closed cylinder 170 which may correspond to the cylinders 149 and 150 of Fig. 9 are housed a plurality of pistons 172—175, each of which is adapted to be positioned in an extended or retracted position. The right end of the cylinder 170 is closed by a circular member 176 which may be secured to or made an integral part of the cylinder bore. A detachable insert 177 seals the left end of the cylinder bore by means of a threaded arrangement, as shown. Connecting rods 181—184 are attached to respective pistons 172—175 by means of threaded inserts 186—189 which are adjustably secured in the threaded portions of the respective pistons. Head members 191—194, associated with respective connecting rods 181—184, are limited in movement to the left by the threaded inserts 177 and 186—188 respectively, and in movement to the right by corresponding retaining rings 196—199. With this arrangement each of the pistons 172—175 may assume either of two positions, i.e. a retracted position as indicated by piston 175 or an extended position as indicated by piston 174, for example. The lateral position of a control arm 200, which may correspond to the plungers 150 and 160 of Fig. 9, may be varied by extending or retracting the various pistons with the presence or absence of fluid under pressure.

For the purpose of extending the various pistons, fluid under pressure is supplied through ports 201 through 204 from a source 205 via lines 206 through 209 under control of associated three-way valves 211 through 214. The three-way valve 211, for example, is shown in the operating position supplying fluid under pressure from the source 215 to the line 216, thereby positioning the piston 172 in the extended position. The fluid under pressure in effect causes the piston 172 to move to the right until the head member 191 engages the retaining ring 196. The piston 172 is held rigidly thereafter in the position shown. In a similar manner, pistons 173 through 175 may be caused to assume the extended position by the admission of fluid under pressure through respective lines 207 to 209.

For the purpose of causing the pistons 172 through 175 to assume the retracted position, three-way valves 211 through 214 are operated to the position where the lines 206 through 209 are connected to a low pressure region by means of outlet lines 216 through 219. In a system where compressed air is used, for example, the outlets 216 through 219 may exhaust as a matter of convenience into the atmosphere. Where oil or other liquids are used, the outlets 216 through 219 may empty into a sump, for example. A system using compressed air is assumed hereinafter for purposes of discussion. The source of fluid pressure 205 is connected further to an inlet line 220 for the purpose of providing a force on the right-hand face of the piston 175 which serves to stack all pistons connected to the atmosphere by the three-way valves 211 through 214. The three-way valve 214, connecting the line 209 to atmospheric pressure, controls the position of the head member 194. When the three-way valve 214 is operated as shown, atmospheric pressure against the left-hand face of the piston 175 exerts a total force which is less than the total force exerted on the right-hand face of the piston 175; consequently, the piston 175 moves in a direction to the left until the head member 194 engages the threaded insert 188 of the piston 174. In a similar manner, any one or all or a combination of the pistons 172 through 175 may be controlled by the three-way valves 211 through 214 to assume the retracted or stacked position.

Since the diameter of the control arm 200 is greater than the diameter of the linking members 181 through 184, the total force exerted on the right-hand face of the piston 175, as a result of the application of fluid under pressure thereto, is less than the total force exerted on the left-hand face of pistons 172 through 175 when high pressure fluid is supplied to these pistons; consequently, the piston 175 is unable to cause any one or a combination of the pistons receiving high pressure fluid to be stacked. The difference in the forces acting on opposite faces of the piston 175 is the force effectively operating the control arm 200. If it is desired to increase the speed at which the pistons may be caused to change from one combination to another, the pressure of the source 205 may be increased accordingly.

A register, indicated generally by the dotted block 221, is employed to operate the three-way valves in accordance with a digital control signal translated through a suitable multiwire cable 222 which may be connected to the computer 148. The register includes electro-mechanical relay devices 226 through 229 for actuating the three-way valves 211 through 214. Whenever a control signal which may, for example, be a positive voltage, is supplied to one of the relays 226 through 229, the relay operates a corresponding three-way valve to cause fluid under pressure to be supplied to an associated piston for the purpose, as explained above, of causing the piston to assume the extended position. Alternatively, when a relay is not actuated by a control signal the corresponding three-way valve assumes its normal position, supplying atmospheric pressure to the associated piston. This causes the associated piston to assume the retracted position.

If the relay 226 is actuated by a control signal the associated three-way valve 211 is operated to connect the line 206 to the source of fluid under pressure 205; as a result, the piston 172 is caused to assume the extended position. On the other hand, if the relay 229 is not operated, the three-way valve 214 connects the inlet 209 to atmospheric pressure and the total force on the left-hand face of the piston 175 is then less than the total force on the right-hand face thereof and causes this piston to move to the left and assume the retracted position.

The number of pistons included in the converter unit of Fig. 10 may of course vary according to the system of digital representation employed. For example, the converter may be used in a straight-forward binary representation, e.g., 1, 2, 4, 8, etc. wherein the foregoing quantities are represented by the various pistons connected in tandem, with the first piston (172) being capable of extending the control arm 200 by one unit, the second piston (173) by two units, the third piston (174) by four units, etc. The converter is equally adaptable to a binary-decimal representation of 1, 2, 4, 8, 10, 20, etc., wherein the first piston (172) is capable of extending the control arm (200) by one unit of length, the second piston (173) by two units, the third piston (174) by four units, the fourth piston by eight units, the fifth piston by ten units, the sixth piston by twenty units, etc.

When all of the pistons of the converter of Fig. 10 assume the retracted position, the control arm 200 rests in its zero or left-most position, and when all of the pistons assume the extended positions, the control arm 200 rests in its fully extended or right-most position. The control arm 200 may assume any predetermined position between the two foregoing extremes by extending and retracting the pistons in various combinations. The position of the control arm 200 of each converter unit is translated by means of the flexible band connected thereto to the associated member of the manipulator, i.e., the swinging base, boom, etc.

In operation the manipulator 12 may be controlled by the converter units 142—146 and the computer 148 to position the tool 30 in any desired position within a given work space which is, of course, dependent upon the dimensions of the various members of the manipulator 12. Thus the tool 30 may be lowered from the position shown in Fig. 1 to the level of the base plate 17 and the jaws 36 and 37 may be actuated to pick up a suitable part such as a semiconductor device. Different portions of the arm arrangement 12 may then be rotated by means of one or more of the flexible bands and the converter units discussed previously to cause the tool 30 to carry the part that was picked up to a new location within the given work space. Other types of tools, for example drills, may also be secured within the tool holder 28 for performing drilling or other operations on the article of manufacture. By suitably programming the computer 148 any desired number of operations may be performed on an article of manufacture by the manipulator or positioner of the present invention. Furthermore, these operations may be readily changed to accommodate design changes in the article by reprogramming the computer. The entire positioner of the present invention may be moved from one location to another by merely moving the base plate 17 with the manipulator 12 and the converter units secured thereto to facilitate manufacturing changes. The positioner may also be placed in an enclosed chamber if it is desired to control the atmosphere, temperature, etc., to which the parts being manufactured are subjected.

There has thus been disclosed a digital-to-analog positioner which is capable of positioning and performing operations on articles of manufacture and parts thereof with extreme precision in a controlled environment.

We claim:

1. A mechanical positioner comprising a stationary base, a swinging base rotatably mounted on the stationary base about a first axis, an elongated boom, one end of the boom being rotatably mounted on the swinging base about an axis that is disposed at right angles with respect to the first axis, a beam, one end of the beam being rotatably mounted on the other end of the boom about an axis that is disposed in parallel relationship with respect to the second axis, a wrist member mounted on the other end of the beam about an axis that is disposed in parallel relationship with respect to the second axis, a tool holder adapted to hold a suitable tool rotatably mounted on the wrist member about an axis disposed in parallel relationship with respect to the first axis, means including a first flexible band connected to the swinging base for rotating the swinging base relative to the stationary base, means including a second flexible band connected to the boom for rotating the boom relative to the swinging base, means including a third flexible band connected to the beam for rotating the beam relative to the boom, means including a fourth flexible band coupled to the wrist member for rotating the wrist member relative to the beam and means including a fifth flexible band connected to the tool holder for rotating the tool holder relative to the wrist member.

2. A mechanical positioner as defined in claim 1 wherein each of the means includes a digital-to-analog converter, each of the converters having a shaft connected to the flexible band associated therewith and arranged to change the position of the band relative to the swinging base in response to a digital signal.

3. A mechanical positioner as defined in claim 2 wherein the digital-to-analog converter included in the means for rotating the wrist member relative to the beam is connected to the fifth flexible band for moving the fourth and fifth flexible bands in response to a digital control signal to prevent rotation of the tool holder relative to the wrist member as the wrist member is rotated relative to the beam.

4. A mechanical positioner as defined in claim 2 including means for guiding the second, third, fourth and fifth bands through the swinging base, means for guiding the second, third and fourth bands through the boom, and means for guiding the fourth and fifth bands through the beam.

5. A mechanical positioner as defined in claim 4 wherein the guide means for guiding the bands through the swinging base are arranged to cause the second, third and fourth bands to pass substantially through said first axis so that relative movement between the swinging base and the stationary base will not appreciably change the positions of the second, third and fourth bands, the guide means for guiding the bands through the swinging base being further arranged to cause the fifth band to rotate the tool holder in an opposite direction to the rotation of the swinging base.

6. A mechanical positioner as defined in claim 5 wherein the guide means for guiding the bands through the boom are arranged to cause the third band to rotate the beam in an opposite direction to the direction of rotation of the boom, whereby the beam will remain in a fixed plane with respect to the boom, as the boom is rotated about the swinging base.

7. A mechanical positioner as defined in claim 6 wherein the guide means for guiding the fourth and fifth bands through the beam are arranged to cause the fourth band to rotate the wrist member in an opposite direction to the direction of rotation of the beam and to prevent relative rotation between the wrist member and the tool holder.

8. A mechanical positioner comprising a stand, a base mounted on the stand for rotation about a first axis, an elongated swingable boom having one end pivotally mounted to the base for swinging movement about an axis that is disposed substantially at right angles with respect to the first axis, a beam having one end pivotally mounted to the other end of the boom and swingable about an axis that is disposed in parallel relationship with respect to the second axis, a wrist member mounted on the other end of the beam about an axis that is disposed in parallel relationship with respect to the second axis, a holder rotatably mounted on the wrist member about an axis disposed in parallel relationship with respect to the first axis, means for resiliently urging the rotatable or pivoted elements towards a reference position, and means including flexible bands connected to said rotatable or pivoted elements for independently changing the positions of the rotatable or pivoted elements in controlled increments.

9. A portable manipulator including a supporting base, a rotatable base member mounted on the supporting base, an elongated upright boom having one end pivotally mounted to the rotatable base, a beam having an end pivotally mounted to the other end of the boom and disposed in a generally horizontal position and swingable relative to said boom, a wrist member rotatably mounted on the free end of the beam, a holder adapted to receive a tool and mounted on the wrist member for rotation therewith and rotatable relative to said wrist member about a generally vertically disposed axis, individual control element connected to each of the aforementioned rotatable or pivoted elements coupled through said rotatable base member, means for biasing the rotatable or pivoted elements towards a reference position, and means for independently actuating the individual control elements in preselected and variable increments to move same away from said reference position.

10. A portable manipulator as defined in claim 9 wherein said actuating means includes a programable digital computer and an individual analog to digital converter connected to each of said control elements and coupled to be responsive to the computer.

References Cited in the file of this patent

UNITED STATES PATENTS

| | | |
|---|---|---|
| 2,817,775 | Rosenberg et al. | Dec. 24, 1957 |
| 2,822,094 | Greer | Feb. 4, 1958 |

FOREIGN PATENTS

| | | |
|---|---|---|
| 781,465 | Great Britain | Aug. 21, 1957 |